United States Patent [19]

Sasaki et al.

[11] Patent Number: 4,697,827
[45] Date of Patent: Oct. 6, 1987

[54] SEAT BELT DEVICE FOR A VEHICLE

[75] Inventors: Kiichi Sasaki, Wako; Hiroshi Tabata, Utsunomiya; Hisakazu Okuhara, Utsunomiya; Kazuo Higuchi, Utsunomiya, all of Japan

[73] Assignee: Honda Giken Kogyo Kabushiki Kaisha, Tokyo, Japan

[21] Appl. No.: 912,470

[22] Filed: Sep. 29, 1986

Related U.S. Application Data

[62] Division of Ser. No. 767,531, Aug. 20, 1985, Pat. No. 4,643,449.

[30] Foreign Application Priority Data

Aug. 23, 1984 [JP] Japan .................................. 59-175650
Aug. 23, 1984 [JP] Japan .................................. 59-175651
Aug. 31, 1984 [JP] Japan .................................. 59-182056

[51] Int. Cl.⁴ .............................................. B60R 22/00
[52] U.S. Cl. ...................................... 280/808; 297/481
[58] Field of Search ...................... 280/801, 802, 808; 297/481, 483, 468, 474

[56] References Cited

U.S. PATENT DOCUMENTS 4,496,170 1/1985 Sasaki et al. ........................ 280/801
4,536,010 8/1985 Matsunami et al. ................ 280/802

FOREIGN PATENT DOCUMENTS 94120 4/1973 Japan .

Primary Examiner—John J. Love
Assistant Examiner—Karin L. Ferriter
Attorney, Agent, or Firm—Armstrong, Nikaido, Marmelstein & Kubovcik

[57] ABSTRACT

A seat belt device provided with a reach arm having a fore end to which a free end of a seat belt is tied, which reach arm is at a rearward withdrawn position when the seat belt is not in use whereas it is swung, when the seat belt is in use, to be projected forwardly to enable wearing of the seat belt. The reach arm assumes a compact form with an intermediate portion thereof folded in a non-used position whereas it assumes a straight state in use. A belt connecting hole provided at the fore end of the reach arm is shaped so as to hold the seat belt on a longitudinal extension of the reach arm when the reach arm is at an operative position. The reach arm is further designed foldable in a direction substantially perpendicular to its swinging direction when applied with a great shock at the operative position thereof.

3 Claims, 11 Drawing Figures

SEAT BELT DEVICE FOR A VEHICLE

This is a division of application Ser. No. 767,531 filed Aug. 20, 1985, now U.S. Pat. No. 4,643,449.

BACKGROUND OF THE INVENTION

1. Field of the Invention

The present invention relates to a three-point support seat belt device for a vehicle, particularly, for a vehicle in which a front seat and a rear seat are arranged within a compartment in a longitudinal direction of the vehicle.

2. Description of the Prior Art

A conventional seat belt device is disclosed, for example, in Japanese Patent Application Laid-Open No. 94,120/73 in which a reach arm is supported on one side of a seat within the compartment so that the reach arm may swing back and forth, and a seat belt which is drawn out from a retractor is attached to an end of the reach arm, whereby when the seat belt is to be worn, the reach arm is swung forwardly so as to guide the seat belt to the place near the hand of an occupant seated on the front seat.

However, in case such a device as described above is applied to the front seat, there arises a problem that when the length of the reach arm is set so that the seat belt may occupy a position where it is most easily worn when the reach arm is swung forwardly, inconveniences are encountered such that when the reach arm is swung to its non-used position or rearwardly, the reach arm interferes with the rear seat and/or disturbs a person in getting on and off the rear seat.

SUMMARY OF THE INVENTION

It is an object of the present invention to overcome the above-described inconveniences by providing a seat belt device in which when the seat belt is not in use, the reach arm can be housed compactly; when the seat belt is to be used, the reach arm can project forwardly to let the seat belt occupy a position where the belt can be worn most easily; and when the seat belt is in use and a great shock is applied thereto, the device can effectively cope with such shock.

To attain the above-described object, according to a first aspect of the present invention, there is provided a seat belt device for a vehicle in which a front seat and a rear seat are arranged within a compartment in a longitudinal direction of the vehicle, a reach arm is provided on one side of the front seat for swing motion forwardly and rearwardly of the vehicle, a seat belt drawn out from a retractor is attached to a fore end of the reach arm, and a through-tang mounted on the seat belt is detachably connected to a buckle provided on the other side of the front seat, wherein said reach arm is divided into a base arm supported on the one side of the front seat in a swingable manner forwardly and rearwardly of the vehicle and a fore arm mounted on the seat belt, said base arm and said fore arm being connected together so that they are foldable at their connection in the swinging direction of the reach arm, a restriction member being provided between said base arm and said fore arm for forcing the reach arm to be stretched straight when said base arm and fore arm are swung to an operative position forwardly of the front seat.

With the above-described arrangement, the reach arm can be formed to have a desired length so that the seat belt can be worn very easily. When the reach arm is brought to its non-used or inoperative position, it can be folded to the back of the front seat in a compacted figure. Thus, the reach arm never interferes the rear seat and does not disturb a person in getting on and off the rear seat.

According to a second aspect of the present invention, a seat belt device for a vehicle is provided in which a front seat and a rear seat are arranged within a compartment in a longitudinal direction of the vehicle, a reach arm is provided on one side of the front seat for swing motion forwardly and rearwardly of the vehicle, a seat belt drawn out from a retractor is attached to the reach arm, and a through-tang mounted on the seat belt is detachably connected to a buckle provided on the other side of the front seat, wherein said reach arm is formed at its fore end with a belt connecting hole to which a free end of the seat belt is connected so as to be relatively rotatable in a swinging direction of the reach arm, said belt connecting hole being provided with an engaging portion which engages the free end of the seat belt to hold the latter on a longitudinal extension of the reach arm when the reach arm is swung to its operative position.

With the above-described arrangement, the free end of the seat belt is held at a position on the longitudinal extension of the reach arm when the reach arm is swung forwardly, and therefore, the seat belt can be worn easily. Moreover, when the reach arm is at the non-used position, the reach arm and the free end of the seat belt are folded relative to each other at the back of the front seat and housed compactly. The reach arm and the seat belt never interfere with access to the rear seat and do not disturb a person in getting on and off the rear seat.

According to a third aspect of the present invention, a seat belt device for a vehicle is provided in which a reach arm is provided on one side of a seat arranged within a compartment for swinging motion forwardly and rearwardly of the vehicle, a seat belt drawn out from a retractor is attached to a fore end of the reach arm, and a through-tang mounted on the seat belt is detachably connected to a buckle provided on the other side of the seat, wherein said reach arm comprises a base arm supported on one side of said seat in a swingable manner forwardly and rearwardly of the seat, a fore arm connected to the base arm so as to be foldable at their connection in a direction substantially perpendicular to the swinging direction of the base arm and toward said seat, said fore arm being provided at a fore end thereof with a portion connectable with said seat belt, and a resilient member provided between said fore arm and said base arm to hold both the arms substantially straight.

With the above-described arrangement, when the reach arm is swung between its operative and inoperative positions, the reach arm is held in straight figure and its swinging motion is carried out lightly and smoothly within a narrow space. When the reach arm is at the operative position, the fore arm can be folded toward the seat relative to the base arm to provide a good wearing property for the occupant. When an excessive tension is exerted on the seat belt due to a collision of the vehicle or the like, the reach arm is folded toward the seat as described above whereby any excessive bending moment does nor act on the reach arm and the greater part of the excessive tension applied to the belt can be acted upon the reach arm as a simple tension. For this reason, the reach arm need not be provided with such high strength as to resist against the excessively great bending moment but can be formed narrow in width and compact, thereby not only increasing a freedom of layout, mounting and the like but also leading to less disturbance for a person in getting in and out of the vehicle, and providing the device at less cost.

The above-described and other objects, characteristics and advantages of the present invention will be apparent from reading of the description of preferred embodiments which will be hereinafter described in detail while referring to the accompanying drawings.

BRIEF DESCRIPTION OF THE DRAWINGS

The drawings show several embodiments of the present invention, in which.

DESCRIPTION OF THE PREFERRED EMBODIMENTS

Figure 1:
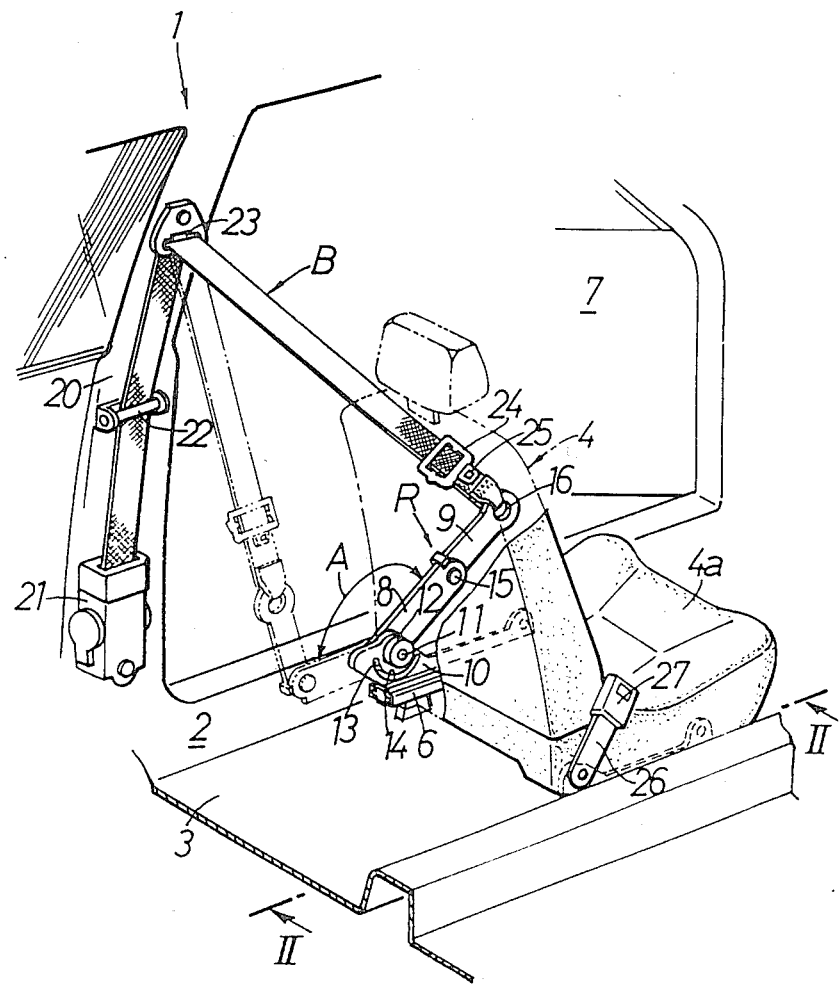
FIGS. 1 to 3 show a device according to a first embodiment, FIG. 1 being a rear perspective view of a front seat provided with the device, FIG. 2 a side view of front and rear seats, and FIG. 3 a perspective view of a reach arm.

Referring now to the drawings, several embodiments of the present invention will be described. Throughout these embodiments, corresponding elements are indicated by like reference numerals and characters.

Figure 2:
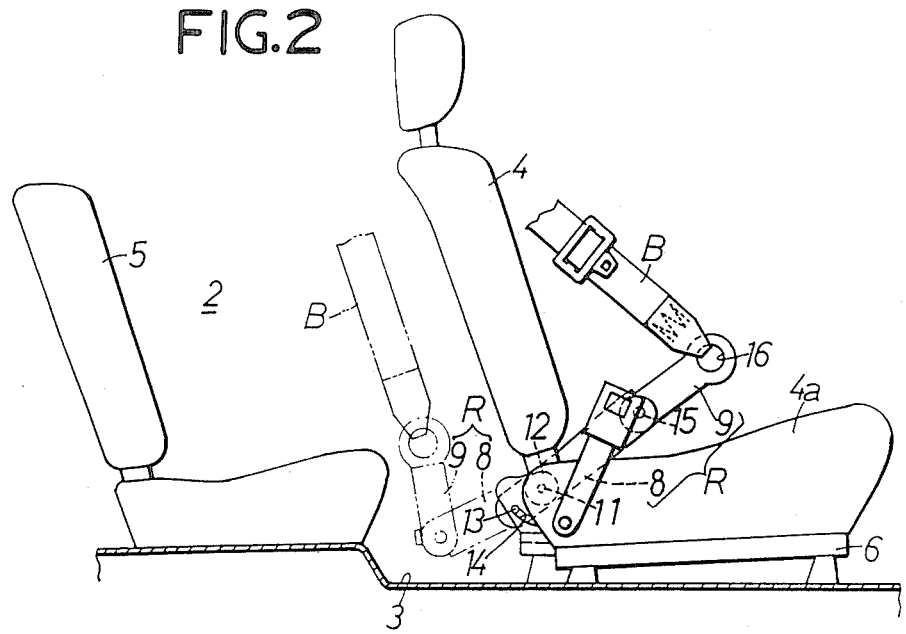
Figure 3:
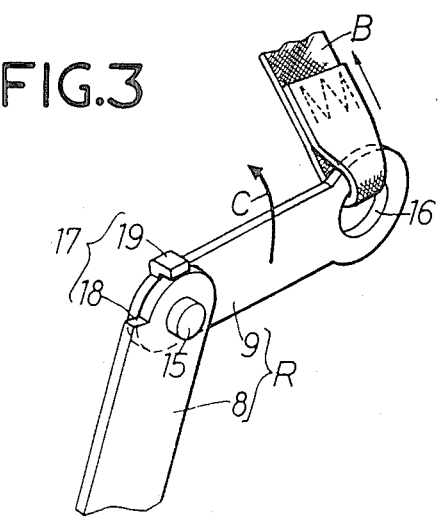
Figure 4:
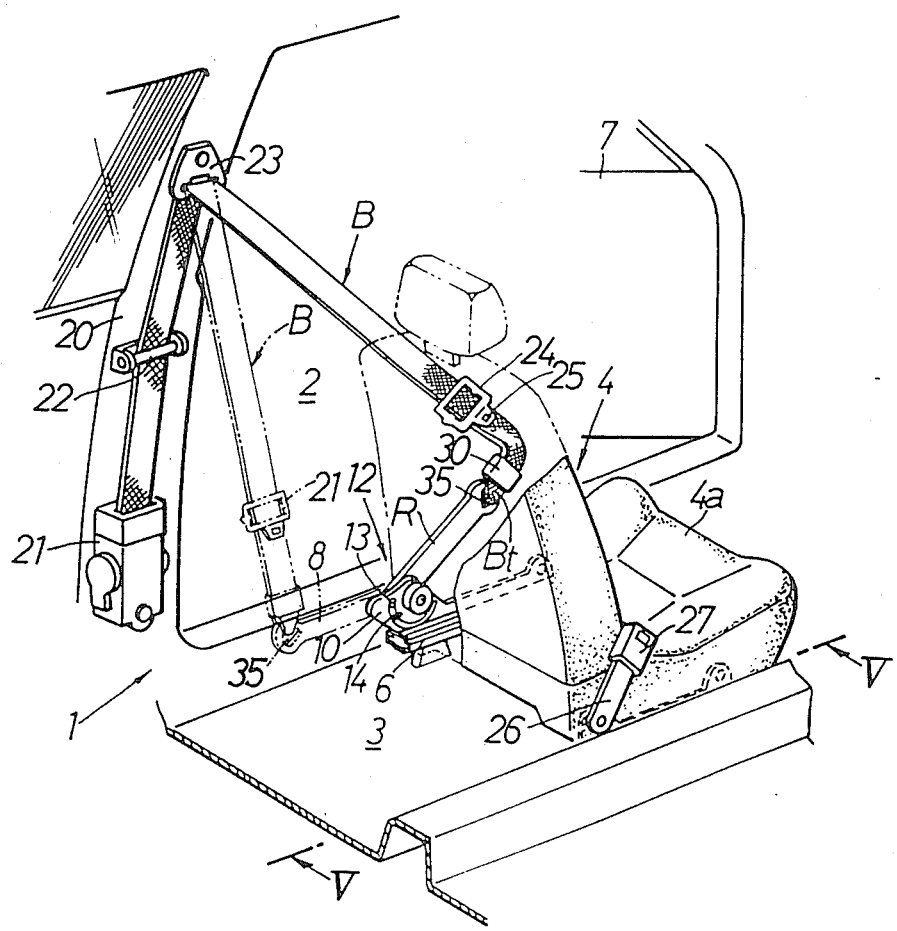
FIGS. 4 to 7 show a device according to a second embodiment, FIG. 4 being a perspective view similar to FIG. 1, FIG. 5 an enlarged perspective view as viewed from line V of FIG. 4, FIG. 6 an enlarged view showing a part of FIG. 5 and FIG. 7 a sectional view taken on line VII—VII of FIG. 6.
Figure 5:
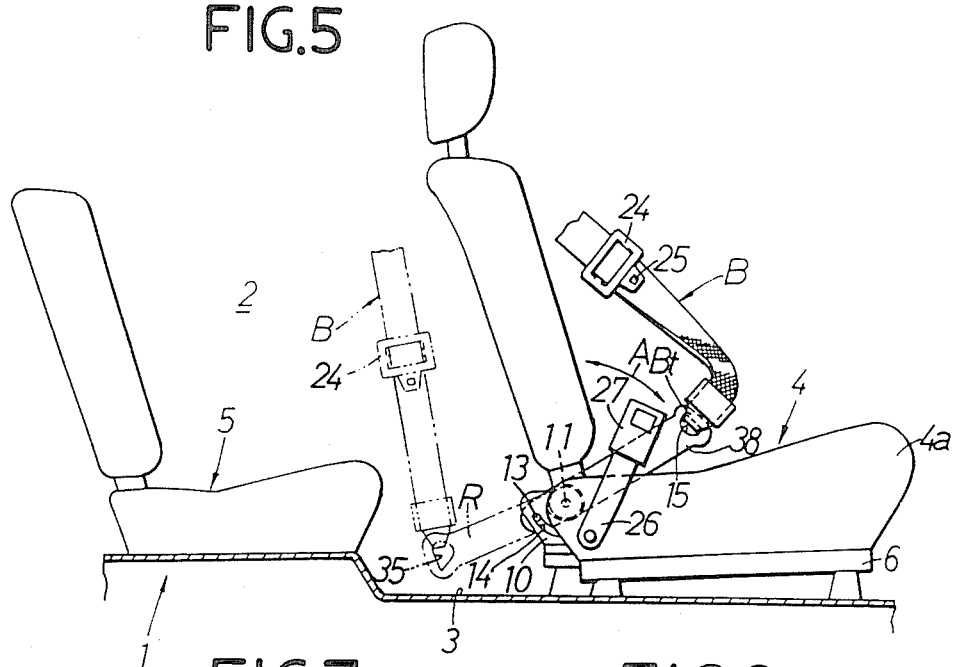
Figure 7:
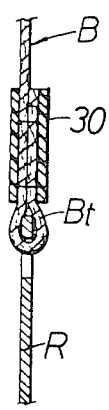

FIGS. 1 to 3 show a first embodiment of the present invention. A front seat 4 and a rear seat 5 are longitudinally arranged on a floor surface 3 within a compartment 2 of a vehicle body 1. The front seat 4 can be slidably moved back and forth on a guide rail means 6 on the floor surface 3.

Externally of a seat portion 4a of the front seat 4, i.e., on one side thereof near an opening and closing door 7 is provided the base end of a bendable reach arm R so as to be swingable toward back and forth. The reach arm R is divided into a base arm 8 and a fore arm 9. A base end of the base arm 8 is pivoted at 11 on a frame 10 provided on the one side of the seat portion 4a of the front seat 4 so that the base arm 8 can swing back and forth. A driving device 12 such as an electric motor is provided on the frame 10 and is connected to the base arm 8, and by actuation of the driving device 12 the base arm 8 is driven to swing back and forth as indicated by the arrow A in FIG. 1. A stopper pin 13 is projected on the base of the base arm 8 and is fitted into an arcuate hole 14 bored in the frame 10, whereby a swing angle of the base arm 8 is defined.

The base end of the fore arm 9 is connected to the free end of the base arm 8 via a pivot shaft 15 in a manner that the fore arm 9 can be folded about the shaft 15 in the swinging direction of the base arm 8. An annular belt connecting hole 16 is formed in the fore end of the fore arm 9, and the end of a seat belt B is attached to the belt connecting hole 16.

Between the base arm 8 and the fore arm 9 is provided a restriction member 17 which restricts both the arms so as to stretch straight when the arms are swung forwardly of the front seat 4. This restriction member 17 comprises an engaging shoulder 18 formed on the fore end of the base arm 8 and an engaging projection 19 formed on the base end of the fore arm 9. These shoulder and projection are brought into engagement with each other by tension of the seat belt B, when the reach arm R is moved fowardly of the front seat 4, to hold the reach arm R straightly.

Rearwardly of the front seat 4, a retractor 21 is provided at the lower portion of a wall 20 of the compartment. The seat belt B drawn from the retractor 21 extends upwardly along the wall 20 and is pulled out inwardly of the compartment 2 through a guide roller 22 and a guide ring 23 which are provided on the wall 20, and the free end of the seat belt B is attached to the belt connecting hole 16 at the fore end of the reach arm R. A through-tang 24 is slidably disposed halfway of the seat belt B, and an engaging hole 25 is bored in one side end of the through-tang 24.

A support arm 26 is obliquely forwardly projected on the other side of the front seat 4 near a central portion within the compartment 2, a buckle 27 is attached to the front end of the support arm 26, and the engaging hole 25 of the through-tang 24 is detachably connected to the buckle 27.

Operation of the first embodiment will be described.

When the three-point seat belt device is not in use, the reach arm R stays housed rearwardly of the front seat 4. In this state, the reach arm R is bent or folded as shown by the chain lines in FIGS. 1 and 2 and by the solid line in FIG. 3 and stays between the front and rear seats 4 and 5 compactly without disturbing an occupant.

When an occupant seated on the front seat 4 wishes to wear the seat belt B, by actuating the driving device 12, the base arm 8 of the reach arm R is swung forwardly. As the base arm 8 swings forwardly, the fore arm 9 is applied with rearward tension caused by the seat belt B so that the fore arm 9 is rearwardly turned around the pivot shaft 15 as shown by the arrow C of FIG. 3. Then when the reach arm R is swung to its operative position forwardly of the front seat 4 as shown by the solid lines in FIGS. 1 and 2, the engaging shoulder 18 and the engaging projection 19 are brought into engagement with each other under the action of the tension of the seat belt B and the reach arm R assumes its stretched straight state. The seat belt B attached to the connecting hole 16 at the fore end of the reach arm R is then guided to the place near the hand of the occupant on the front seat 4. Here, the occupant pulls the through-tang 24 inserted through the seat belt B while sliding the through-tang 24 along the seat belt B to engage the engaging hole 25 with the buckle 27.

By the above-described operation, the seat belt B is worn on the occupant seated on the front seat 4. In this case, since the seat belt device is of the three-point support type, the seat belt B extends diagonally obliquely from the shoulder toward the waist of the occupant and further extends laterally along an abdominal portion of the occupant.

Alternatively, the base arm 8 of the reach arm R may be supported directly on the vehicle body sideways of the front seat 4.

FIGS. 4 to 7 show a second embodiment of the present invention, in which embodiment, a reach arm R is formed straightly by means of a single member.

Figure 6:
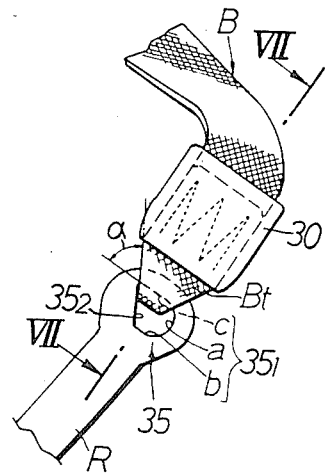

As best shown in FIG. 6, in the fore end of the reach arm R is bored a belt connecting hole 35 through which a free end Bt of the seat belt B is inserted and connected, which will be described later. This connecting hole 35 comprises, as shown in FIG. 6, a U-shaped curve portion $35_1$ consisting of an arcuate portion a, and inner and outer straight line portions b and c parallel to each other which are connected to both ends of the arcuate portion, and an inclined straight line portion $35_2$ obliquely connected to both ends of the curve portion $35_1$. An angle α formed between the outer straight line portion c and the inclined straight line portion $35_2$ is an acute angle. The aforesaid inclined straight line portion $35_2$ forms an engaging portion for the free end Bt of the seat belt B.

Rearwardly of the front seat, a retractor 21 is provided at the lower part of the wall 20 of the compartment. The seat belt B drawn from the retractor 21 extends upwardly along the wall 20 and is pulled out inwardly of the compartment 2 through a guide roller 22 and a guide ring 23 which are provided on the wall 20, and the free end of the seat belt B is attached to the seat belt connecting hole 35 at the fore end of the reach arm R. The free end Bt of the seat belt B is formed into a convergent trapezoidal shape and reinforced by means of a reinforcing element 30, the free end Bt being made of a film cloth material or the like so that the free end is not deformed widthwise. When the reach arm R swings back and forth, the free end Bt of the seat belt B can freely be turned in the swinging direction of the reach arm R along the curve portion $35_1$ of the belt connecting hole 35 at the fore end of the reach arm R. When the reach arm R swings to the forward operative position, one side of the free end Bt of the seat belt B engages the inclined straight line portion $35_2$ of the belt connecting hole 35, that is, the engaging portion, so that the free end Bt of the seat belt B is retained on an extension lengthwise of the reach arm R. (See FIG. 6.)

Next, operation of the second embodiment will be described.

When the three-point seat belt device is not in use, the reach arm R stays housed rearwardly of the front seat 4. In this case, as shown by the chain lines in FIGS. 4 and 5, the seat belt B is folded substantially at right angles to the longitudinal direction of the reach arm R, that is, the free end Bt thereof is in engagement with the arcuate portion a of the connecting hole 35. In this state, the seat belt B is compactly housed between the front and rear seats 4 and 5 without disturbing an occupant.

When the occupant seated on the front seat 4 actuates the driving device 12 to wear the seat belt B, the reach arm R is swung forwardly. In this case, as the reach arm R swings forwardly, the free end Bt of the seat belt B is freely turned within the belt connecting hole 35 from the arcuate portion a to the outer straight line portion c. Then, when the reach arm R is swung to the operative position forwardly of the front seat 4, tension is applied to the free end Bt of the seat belt B so that one widthwise side thereof engages a connection portion between the outer straight line portion c and the inclined straight line portion $35_2$, i.e., the engaging portion, as shown by the solid lines in FIGS. 4 to 6, as a consequence of which the free end Bt is retained on a longitudinal extension of the reach arm R, whereby the seat belt B is guided to the place near the hand of the occupant seated on the front seat 4. Here, the occupant pulls the through-tang 24 inserted through the seat belt B while sliding the tang 24 along the seat belt B to engage the engaging hole 25 with the buckle 27. By the above-described operation, the seat belt B is worn on the occupant seated on the front seat 4.

When the occupant on the front seat 4 removes the through-tang 24 from the buckle 27 to stop using the seat belt device, the reach arm R is turned to the inoperative position at the rear of the front seat 4 by tension of the seat belt B, and at that time, the free end Bt of the seat belt B is turned in a direction opposite to that during the aforementioned belt wearing operation within the belt connecting hole 35 of the reach arm R, and the arm R is housed in a folded state as shown by the chain lines in FIGS. 1 and 2 with the free end Bt being engaged the arcuate portion a of the curve portion $35_1$.

FIGS. 8 to 11 show a third embodiment of the present invention. Similarly to the above-mentioned first and second embodiments, a reach arm R provided on the side of the front seat 4 near the opening and closing door 7 is swingable forwardly and rearwardly of the vehicle through operation of the driving device 12. Alternatively, however, it may be designed so that the reach arm R is swung only forwardly by the driving device 12 and is swung rearwardly by a biasing member such as a spring.

Figure 9:
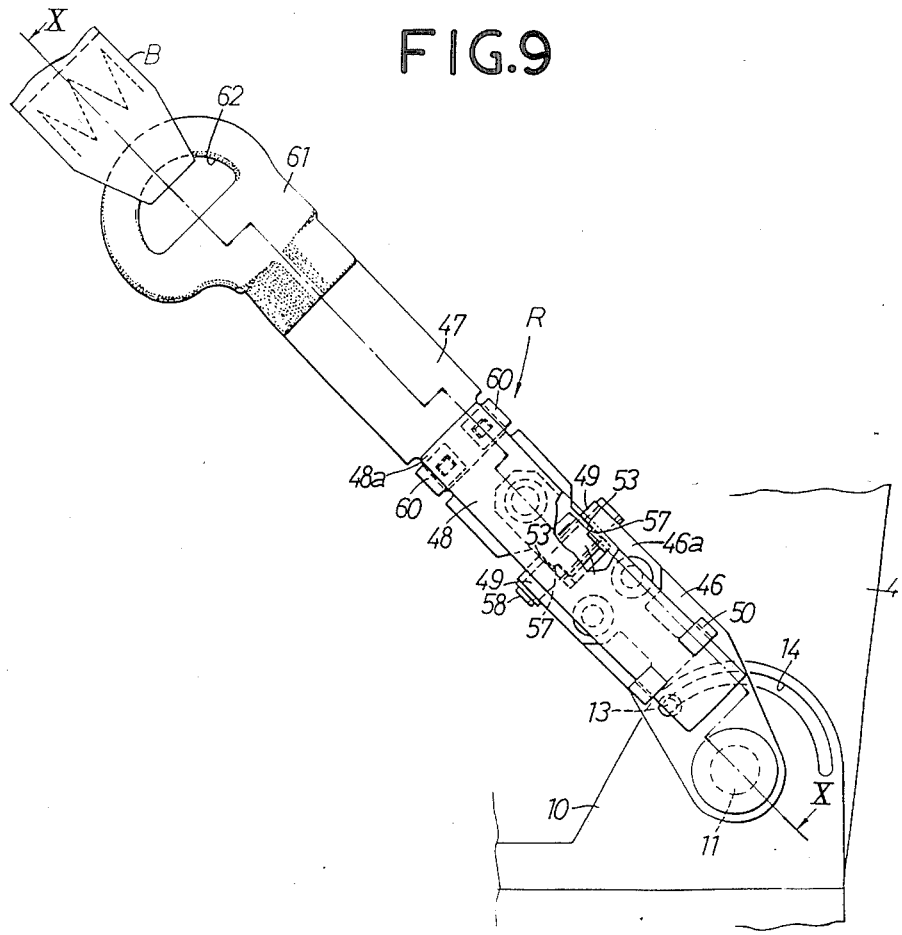
Figure 10:
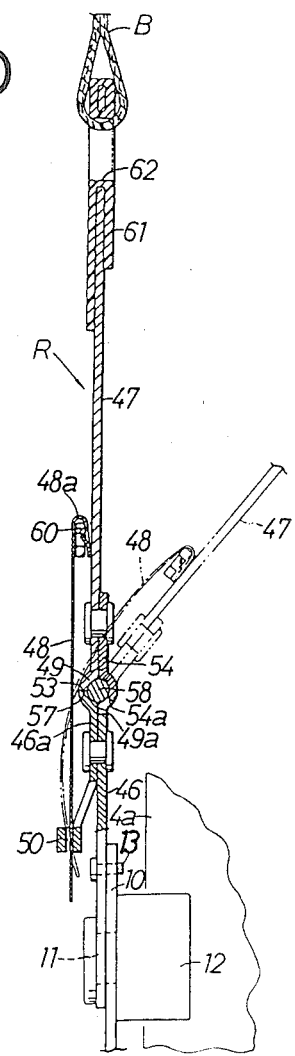
Figure 11:
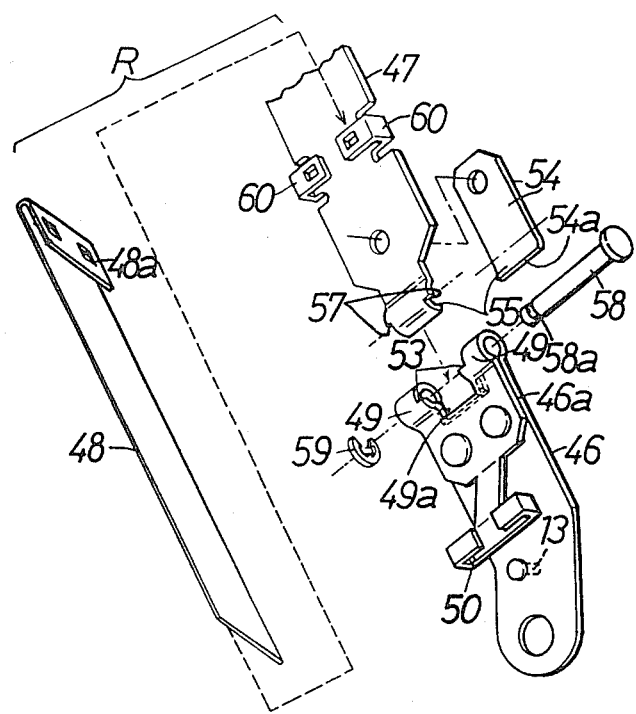

Construction of the reach arm R will be described with reference to FIGS. 9 to 11.

The reach arm R is composed of a base arm 46, a fore arm 47 and a resilient plate 48 for straightly holding these arms 46 and 47.

The base arm 46, which is formed from a plate such as a metal plate, has its base end pivoted at 11 on a frame 10 so as to be swingable forwardly and rearwardly of the vehicle, that base end being connected to the driving device 12 provided on the frame 10. The base arm 46 is provided at a fore end thereof with a turned-up overlapping portion 46a, on the upper edge of which are formed a pair of loop-like left and right pin bearings 49, 49. At a halfway portion of the base arm 46 is formed a channel-like spring guide portion 50 extending outwardly from the turned-up overlapping portion 46a, and a resilient plate 48 which will be hereinafter described in detail is slidably inserted through the spring guide portion 50. Further, in the halfway portion of the base arm 46 is projected a guide pin 13, which is slidably engaged with a guide groove 14 formed in the frame 10 as shown in FIG. 9 to define a swing angle in the forwardly and rearwardly direction of the base arm 46. The pin bearings 49, 49 are formed at their inner ends with engaging shoulders 53, 53, respectively, which engage engaging shoulders 57, 57 of the arm 47 which will be hereinafter described in detail.

The fore arm 47, which is also formed from a plate such as a metal plate, is secured with a clamp tongue 54 at its base. A lower edge of the fore arm 4, and a lower edge of the clamp tongue 54 are bent in an arcuate fashion in the directions opposite to each other thereby to cooperatingly define a central pin bearing 55. This central pin bearing 55 cooperates with the aforesaid left and right pin bearings 49, 49 to form a bearing for a pivot pin 58.

The central pivot bearing 55 is formed on both sides thereof with engaging shoulders 57, 57 corresponding to the engaging shoulders 53, 53, respectively. The central pin bearing 55 is put between the left and right pin bearings 49 and 49. The pivot pin 58 is fitted through the bearings 49, 49 and 55, and a circlip 59 is fitted into a clip groove 58a at the end of the pivot pin 58. Then, the base end of the fore arm 47 is connected to the fore end of the base arm 46 in a manner swingable around the pivot pin 58. When the engaging shoulders 57, 57 and the engaging shoulders 53, 53 engage one another, the base arm 46 and the fore arm 47 assume their straight state as shown by the solid lines in FIG. 10.

The clamp tongue 54 is formed at the lower end edge with a stopper surface 54a, and a bending or folding angle of the fore arm 47 is defined by the stopper surface 54a coming into abutment with receiving surfaces 49a and 49a formed on the left and right pin bearings 49 and 49 of the base arm 46.

In a middle portion of the fore arm 47 is formed a pair of U-shaped spring engaging portions 60 60, with which is engaged an engaging hook 48a on the upper end of the resilient plate 48 which will be described hereinafter. The fore arm 47 is provided at its fore end portion with a belt tying portion 61 formed of a soft material such as synthetic resin or the like, and the end of the seat belt B is inserted through and connected to a belt connecting hole 62 formed in the belt tying portion 61.

The aforesaid resilient plate 48 is formed from a strip-like plate spring, on the upper end of which is formed the mentioned engaging hook 48a. As shown in FIG. 10, the resilient plate 48 has its lower porrion inserted through the spring guide portion 50 of the base arm 46 and the engaging hook 48a formed at the upper end thereof is brought into engagement with the spring engaging portions 60, 60 of the fore arm 47. With this arrangement, the resilient plate 48 is extended between and over one side surfaces of the base arm 46 and the fore arm 47 to straightly hold these arms 46 and 47 by the resilient force of the plate 48 as shown in FIG. 10.

Figure 8:
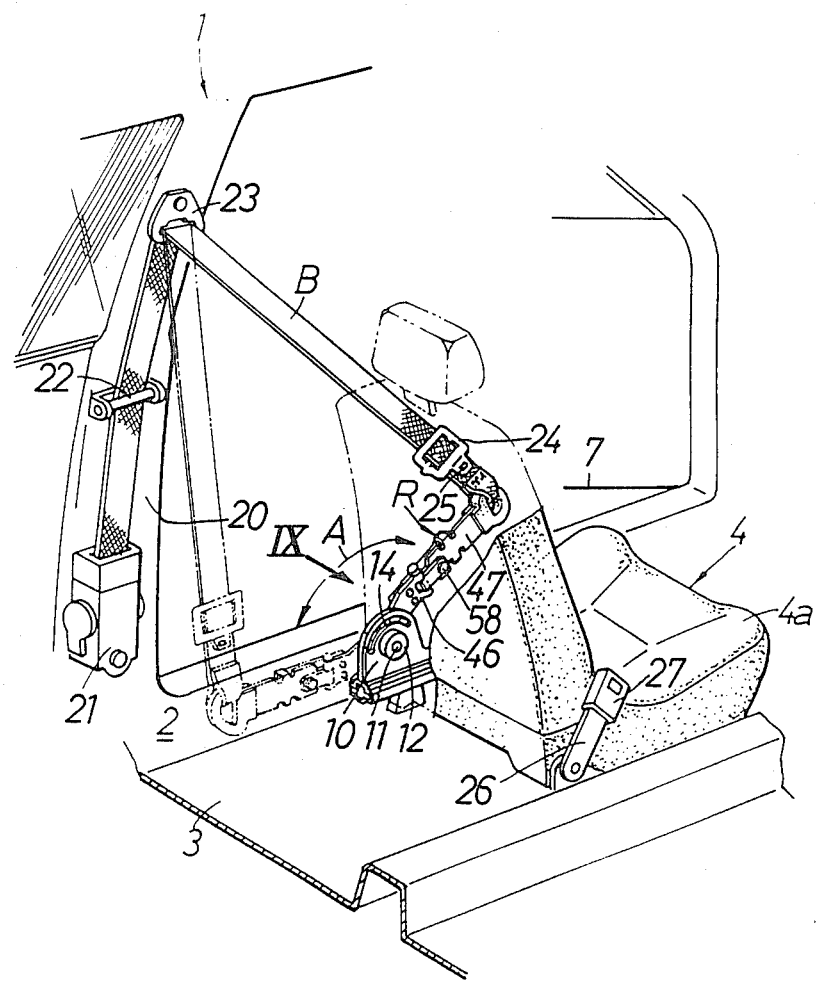
FIGS. 8 to 11 show a device according to a third embodiment, FIG. 8 being a perspective view of the seat similar to FIG. 1, FIG. 9 an enlarged perspective view as viewed from line IX of FIG. 8, FIG. 10 a sectional view taken on line X—X of FIG. 9, and FIG. 11 an exploded perspective view of the reach arm.

When the reach arm R is foldable around the pivot pin 58 is pivoted at 11 on the frame 10 so as to swing back and forth as shown in FIG. 8, the axis of the pivot pin 58 is positioned on a vertical surface extending along the back and forth direction of the seat 4, and the fore arm 47 can be folded laterally of the seat 4 with respect to the base arm 46.

In the following, operation of the just-mentioned embodiment will be described.

When the seat belt B is not in use, the reach arm R stays housed rearwardly of the front seat 4 is shown by the chain line in FIG. 8.

When an occupant seated on the seat 4 wishes to wear the seat belt B, by actuating the driving device 12 the reach arm R is swung forwardly. Thereby, the reach arm R reaches one side of the occupant, and the seat belt B connected to the end thereof is guided to the place near the hand of the occupant. Then, the occupant pulls the through-tang 24 inserted through the seat belt B while sliding the tang 24 along the seat belt B to engage the engaging hole 25 with the buckle 27.

By the aforementioned operation, the seat belt B is worn on the occupant on the seat 4. In this case, the fore arm 47 of the reach arm R can be folded toward the seat 4 around the pivot pin 58 against the resilient force of the resilient plate 48.

When the vehicle encounters a collision or the like to receive an excessively large shock, the retractor 21 becomes locked and the seat belt B protects the occupant on the seat 4. However, in this case, great tension applied to the seat belt B causes the fore arm 47 of the reach arm R to be bent laterally toward the seat 4 around the pivot pin 58 until the stopper surface 54a of the base end thereof abuts against the receiving surfaces 49a, 49a, as shown by the chain line in FIG. 10. Therefore, any excessive bending force does not act on the reach arm R, and the greater part of the tension applied to the seat belt B can be exerted as a simple tension force to the reach arm R.

If the occupant on the seat 4 removes the through-tang 24 from the buckle 27 to disengage the seat belt, the base arm 46 and fore arm 47 of the reach arm R are held to be straight by engagement between the engaging shoulders 57, 57 and the engaging shoulders 53, 53 by the resilient force of the resilient plate 48. Then, the reach arm R is turned to the inoperative postion at the rear of the seat by the operation of the driving device 12 or by the force of a return spring not shown. The reach arm R is held, in its free state, to be straight by the resilient force of the resilient plate 48, against bending outwardly of the compartment 2. Thereby, the reach arm R is free from interference by the opening and closing door 7 or free from being caught by that door 7.

What is claimed is:

1. A seat belt device for a vehicle, comprising a front seat and a rear seat arranged within a compartment provided on one side o front seat so as to be swingable forwardly and rearwardly, a seat belt drawn out from a retractor and attached to a fore end of the reach arm, and a through-tang mounted on the seat belt and capable of being detachably connected to a buckle provided on another side of the front seat, wherein said reach arm is divided into a base arm pivoted on said one side of the front seat for swing motion toward back and forth and a fore arm mounted on the seat belt, said base arm and said fore arm being connected together so as to be foldable at a connection therebetween in the swinging direction of the reach arm, a restriction member being provided between said base arm and said fore arm for restricting said base and fore arms to assume a straight state when the arms are swung to an operative position forwardly of the front seat.

2. The seat belt device according to claim 1, wherein a folding motion of the reach arm from the straight state and a stretching motion thereof from a folded state during the swing motion of the reach arm are carried out by tension of said seat belt.

3. The seat belt device according to claim 1, wherein said restriction member comprises an engaging shoulder provided on one of said base arm and said fore arm, and engaging projection provided on the other thereof, said engaging projection engaging said engaging shoulder in the straight state of said reach arm.

* * * * *

UNITED STATES PATENT AND TRADEMARK OFFICE
CERTIFICATE OF CORRECTION

PATENT NO. : 4,697,827
DATED : October 6, 1987
INVENTOR(S) : KIICHI SASAKI ET AL It is certified that error appears in the above-identified patent and that said Letters Patent is hereby corrected as shown below:

Column 8, line 33, before "provided" insert --- in a longitudinal direction of the vehicle, a reach arm ---.

Column 8, line 33, change "o" to --- of the ---.

Signed and Sealed this

Twenty-second Day of March, 1988

*Attest:*

DONALD J. QUIGG

*Attesting Officer*      *Commissioner of Patents and Trademarks*